Inventors
Fred T. MacKenzie
Edward Quinn
By their Attorney

July 29, 1958     F. T. MacKENZIE ET AL     2,844,832
METHODS OF MAKING SLIP-LASTED PLATFORM SHOES
Filed April 12, 1956     4 Sheets-Sheet 2

Inventors
Fred T. MacKenzie
Edward Quinn
By their Attorney
Thomas J. Ryan

July 29, 1958 F. T. MacKENZIE ET AL 2,844,832
METHODS OF MAKING SLIP-LASTED PLATFORM SHOES
Filed April 12, 1956 4 Sheets-Sheet 3
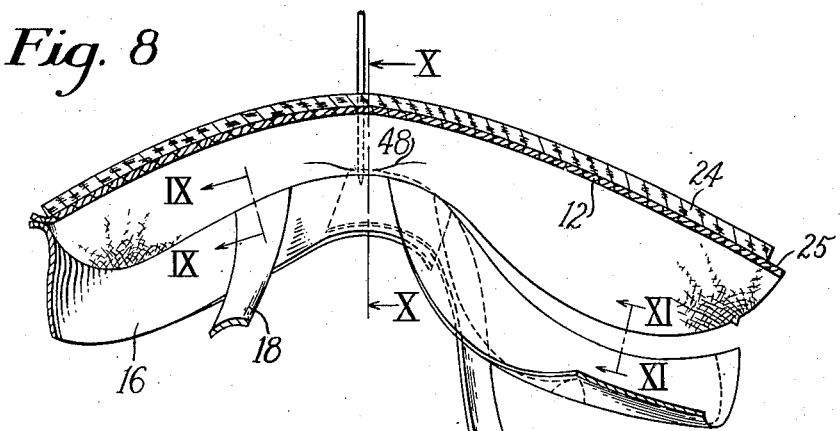
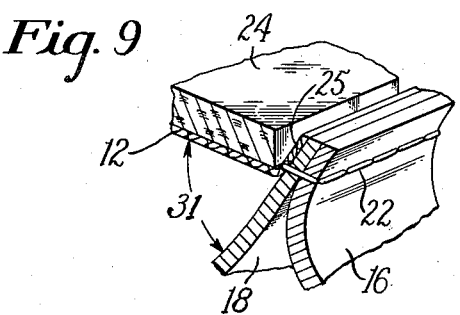
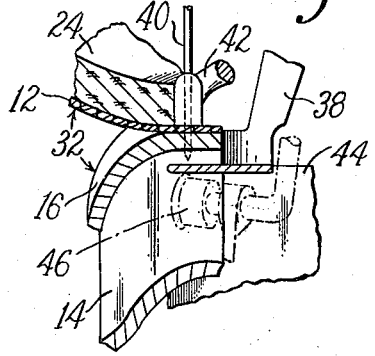
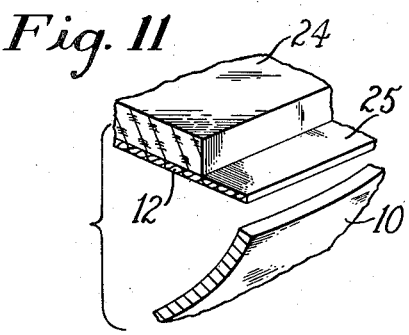
*Inventors*
*Fred T. MacKenzie*
*Edward Quinn*
*By their Attorney*

July 29, 1958   F. T. MacKENZIE ET AL   2,844,832
METHODS OF MAKING SLIP-LASTED PLATFORM SHOES
Filed April 12, 1956   4 Sheets-Sheet 4

Inventors
Fred T. MacKenzie
Edward Quinn
By their Attorney
Thomas J. Ryan.

United States Patent Office 2,844,832
Patented July 29, 1958

2,844,832

METHODS OF MAKING SLIP-LASTED PLATFORM SHOES

Fred T. MacKenzie, Beverly, and Edward Quinn, Saugus, Mass., assignors to United Shoe Machinery Corporation, Flemington, N. J., a corporation of New Jersey Application April 12, 1956, Serial No. 577,699

2 Claims. (Cl. 12—142)

This invention relates to improvements in the manufacture of slip-lasted shoes having platform soles of the type disclosed in United States Letters Patent No. 2,425,420, granted August 12, 1947, and No. 2,546,152, granted March 27, 1951, both upon application of J. D. Chandler.

The usual method of manufacturing slip-lasted shoes includes the steps of assembling and stitching together a matching set of flat parts cut to provide a configuration of a shoe after being sewn together and lasted. Ordinarily, the parts of a shoe are brought together while in flat condition and are flexed during the assembling and stitching operations until their edges are brought into register, the parts being cut from relatively thin, flexible material with outlines of different shapes patterned from the parts of a sample shoe. The shoe parts comprise an upper, a sock lining and a platform wrapper or cover strip for concealing the edges of the parts and for giving the shoe a finished or ornamental appearance. The sock lining usually is an extremely thin, flexible and readily stretched part, the upper and wrapper strip being somewhat less flexible and not so readily stretched. After the parts are sewn together they are shaped by inserting a last and a platform sole composed of thicker, stiffer material than either the sock lining or the upper is applied to the sock lining. The platform sole is applied to the tread surface of the sock lining, principally to provide a pad for the wearer's foot, the wrapper strip being lasted over the edges and carried inwardly of the tread surface of the platform sole where the edges of the wrapper strip are cemented in place.

In all stitching operations on slip-lasted shoe parts it is axiomatic that they must be flexed in advance of the point of stitching operations, sufficiently to bring their edges into register. Unless the parts are flexed they may become attached together in an excessively distorted condition which cannot be corrected even though a last is inserted or though special treatment is given, such as additional stretching and hot ironing after the last is inserted.

According to common practice a platform sole is cut with an outline which will enable it to fit a central area on the sock lining defined by the seam attaching the parts. Due to the flexibility and general tensile weakness of the usual sock lining material and to unavoidable excessive distortion resulting from flexing the upper, wrapper strip and the sock lining in advance of the sewing point, it is rarely possible to sew a seam within the confines of which a precut platform sole may later be fitted with a uniform degree of accuracy, the task of flexing the parts with smooth curvatures during stitching requiring a maximum of exactitude and bringing to stringent test all the skill and ability, which an experienced operator can be expected to demonstrate, without demanding precision in following a seam outline of specified dimensions. Consequently, it has been common in the manufacture of slip-lasted shoes to accept standards of uniformity in appearance and workmanship which are far below those of shoemaking practices known prior to the advent of slip-lasted shoes. For this reason slip-lasted shoes generally are priced lower than other types to offset their likelihood of having defects in configuration and are made from materials inferior to those used in other shoes to enable their lower prices to be offset profitwise.

In the method disclosed in the Chandler patents above identified, the problem of directing the insertion of a seam which will conform accurately to the outline of a precut platform sole in a slip-lasted shoe is simplified by securing the platform sole temporarily to a sock lining before the seam is inserted, the line of the stitches in the seam connecting the parts being directed by an edge face on the platform sole to give a uniform configuration to the finished shoes. Thus, according to the method of the Chandler patents, the configuration of the completed shoe is based accurately upon the outline of the platform sole, the shape and size of which can be duplicated with certainty. In addition, the method disclosed in the Chandler patents includes the formation of a recess or rabbet in the edge face of the platform sole for providing a channel into which the superposed margins of the parts may be folded when a wrapper strip is lasted about the edge face of the platform sole, giving a smooth base for the wrapper strip against the platform sole edge. Certain difficulties, however, are encountered in securing a platform sole to the sock lining of such a slip-lasted shoe before the upper and sock lining are stitched together.

In the construction of slip-lasted platform shoes following the method of Chandler Patent No. 2,546,152, it has been found necessary to attach the sock lining and upper temporarily by cement or otherwise and to employ a curved needle sewing machine to fasten the upper permanently to the sock lining of the shoe, for the reason that it does not seem desirable to intersect the platform sole by the stitches which fasten the parts, as in Patent No. 2,425,420, the stitches in the method of the later Chandler patent being inserted in the upper and sock lining only, as closely as possible to the edge of the platform sole without actually entering the substance of the sole. The needle is thus enabled to emerge from the parts laterally through the channel formed by the rabbet of the platform sole without intersecting the platform sole. If the platform sole is intersected by stitches, which enter one corner of the platform sole, as in the first Chandler Patent No. 2,425,420, it is extremely difficult to guide the seam in a smooth unbroken line along the platform sole corner, and after insertion, the thread in the stitches forms such a rigid connection that there is no opportunity for the wrapper strip to bend uniformly about the corner of the platform sole or for the folded margins to fit closely within the rabbet of the platform sole, so that the completed shoe still has an undesirably distorted appearance. Even with the curved needle machine referred to in Patent No. 2,546,152, it is necessary to insert the permanent fastening stitches with their threads passing at an acute angle through the parts before entering the channel of the platform sole, in a manner which causes slippage between the parts as the stitches are tightened, or which introduces a tendency toward inherent looseness in the stitches after the seam is completed. In any case, to resist the forces tending to distort the parts it is considered necessary with the Chandler method to clamp all the parts, including the platform sole, rigidly in flat condition about the point of stitching operations, so that shoes of only the flattest construction may be sewn reliably with uniform results, the stiffness of the clamped platform sole necessitating excessive and objectionable distortion of the other parts while bringing their edges into register with the edges of the platform sole in advance of the stitching point.

Many advantages of the present invention are derived from the stiffening action of the platform sole on the central area of the sock lining in a slip-lasted shoe and from a consequent concentration of the flexure in the sock lining within a narrow band between the platform sole and the seam line to produce an abrupt but smooth hinge-like bend in the sock lining during stitching. These advantages include elimination of preliminary attachment of the shoe parts and providing an improved facility with which the platform sole stiffened sock lining may be grasped and positioned by the operator during stitching, as compared with an unstiffened flimsy sock lining of more common construction.

The objects of the present invention are to avoid the difficulties encountered in the practice of the method disclosed in the Chandler patents, above referred to, and also to provide additional benefits not attainable heretofore, including convenient maintenance of standards in high-arch, slip-lasted shoe manufacture, comparable with those previously found possible only with the Goodyear welt and other high grade types of shoe, while retaining all the advantages introduced by the Chandler patented methods of procedure.

According to the objects noted, an important feature of the invention resides in the art of making slip-lasted platform shoes having configurations based accurately upon uniform platform sole outlines, in the practice of which the platform sole is not clamped but is left free at all times to diverge from the other shoe parts through a natural, smoothly varying angle, so that in spite of the stiffness and inability of the platform sole to stretch distortion in the other parts is avoided during stitching and the operator who performs the method is enabled to conform the upper of the shoe to the platform sole outline, including portions of reverse bends, inherent in the platform outline and to permit the attachment of the upper with a seam free of puckers. It is therefore possible to insert the stitches in a preferred manner at right angles to those parts only of the superposed margins projecting beyond the platform sole while the parts are flexed into shapes as close as possible to those assumed in a finished shoe with a seam line spaced uniformly on the sock lining from an edge face of the platform sole while successively clamping the margins only of the sock lining and upper, the platform sole being unclamped, and while continuously flexing those parts including the platform sole into a configuration of a completed shoe which is based accurately upon the outline of the platform sole employed. The relatively stiff platform sole, remaining unclamped, is left free to flex to a less extent than the upper, depending upon the stiffness of the upper, and the platform sole, conforming itself as required by the flexure of the upper. Although the central area of the sock lining is stiffened by the platform sole, the platform sole being left unclamped and otherwise unattached or unrestrained, the greater proportion of the flexure in the parts is impressed on the upper as is needful to produce the most desirably shaped shoe configuration.

A further advantage which is derived from the Chandler method of procedure and which is retained in the method of the present invention inures from the use of a platform sole edge face as a guiding surface for directing the line of stitches connecting the other parts. In this aspect of the invention, benefits of which are made evident in the Chandler patents referred to, the use of the platform sole edge face for this purpose is not essential but is useful in the practice of the present invention. For instance, where an accurately cut platform sole is centered exactly upon a correspondingly shaped but larger sock lining, the excess width along the projecting margin of the sock lining will be uniform completely around the outlines of the parts. If the edges of the upper and sock lining are guided by an edge gage acting on the platform sole edge face during stitching, a uniform minimum limit of spacing will be insured between the line of stitches and the edge face without imposition of other precautions. However, if the pattern from which the sock lining is cut does not provide a marginal excess or seam allowance of sufficient width or if the platform sole is not centered accurately, certain portions along the projecting excess of the sock lining will be narrower in width than at other portions. To insure a fixed minimum limit of width for the band between the stitch line and the platform sole edge face under these conditions, it is preferable to utilize an abutment or seam guiding member in the stitching operation as a preventative to the approach of the stitch line too closely to the platform sole edge face.

In machines particularly constructed for successfully sewing a slip-lasted shoe, according to the feature of the invention, last-above mentioned, there is provided a seam guiding member, in the form of a presser foot acting to clamp the parts being sewn and to engage the edge face of the platform sole whenever that face approaches too closely to the stitching point in the machine, either through failure of the operator to direct the seam accurately in accordance with the edge gage employed or through the use of inaccurately centered or cut platform soles or sock linings, with a result that it is impossible to reduce the minimum limit of width in the band between the stitch line and the platform sole. Thus, the stitch line is spaced a fixed distance from the platform sole edge face to provide a narrow band of a limited minimum width, at least sufficient to enable a smooth hinge-like bend to form in the sock lining about the adjacent corner of the platform sole. This feature of the invention contemplates also the use of a wrapper strip attached to the projecting marginal portions of the upper and sock lining and lasting the strip about the platform sole with a 180° bend to bring the marginal portions of the upper and sock lining firmly against the platform sole edge face.

Machines capable of stitching slip-lasted shoes in this manner are disclosed in applications for United States Letters Patent Serial No. 353,997, filed May 11, 1953 (patented April 17, 1956, No. 2,742,005), and Serial No. 503,904, filed April 26, 1955, both in the name of Edward Quinn. The machine of the earlier Quinn application is provided with a work-clamping presser foot having a platform indenting nib projecting transversely of the stitch line across the edge face of the platform sole. While this nib is of benefit under many conditions to assist proper presentation of a stiffened sock lining, it does restrict proper angular divergence of the platform sole and sock lining from the shoe upper to some extent and its use is objected to by some sewing machine operators for this reason. In other respects, the machines referred to have all of the features required to insert stitches in accurately spaced relation to the platform sole edge of a high-arch, slip-lasted shoe constructed according to the features of the present invention. In this way the shoe partakes with certainty of the platform sole configuration and the problem of fitting a platform sole to the stitch line is avoided. These benefits are readily evident when a last is inserted in a shoe assembled by the procedure comprising the present invention, the last being introduced with far less effort and the assembled shoe accommodating with certainty the full size of last for which the parts were designed.

In some circumstances the benefits of the present invention are obtainable where forms of stiffening material other than a conventional platform sole are applied to the sock lining within its central area and where a definite demarcation between the stiffened and unstiffened portions of the sock lining forms a line at the proper distance throughout the edge of the sock lining. Neither does the use of the present invention limit the final construction of a shoe to a single platform sole or to the use of two seams, one connecting the upper and sock lining and the other connecting the wrapper strip to the other parts. In fact, if another platform sole is added after stitching is completed to increase the total sole thickness, it enhances the benefits already obtained.

These and other features of the invention, as herein-after described and claimed, will be apparent from a consideration of the following detailed specification, taken with the accompanying drawings, in which:

Fig. 8 is a side sectional view of a set of shoe parts being assembled in accordance with the present invention, illustrating the manner in which the parts are flexed during the assembling operation after the heel portion of the shoe has been sewn;

Fig. 9 is an angular sectional view on an enlarged scale, as seen from the line IX—IX of Fig. 8;

Fig. 10 is a sectional view on an enlarged scale taken along the line X—X of Fig. 8;

Fig. 11 is an angular sectional view on an enlarged scale, as seen from the line XI—XI of Fig. 8.

The shoe intended to be manufactured by the practice of the present invention is of the so-called "slip-in lasted," or otherwise known in its shortened form as "slip-lasted," type. Such shoe is manufactured by assembling and stitching together a set of matching parts and flexing the parts during their assembly to provide an approximation to the configuration of a shoe based upon the outline of a platform sole. After assembly, a last ordinarily is introduced into the shoe and it is completed by adding a heel and an outsole.

Figure 1:
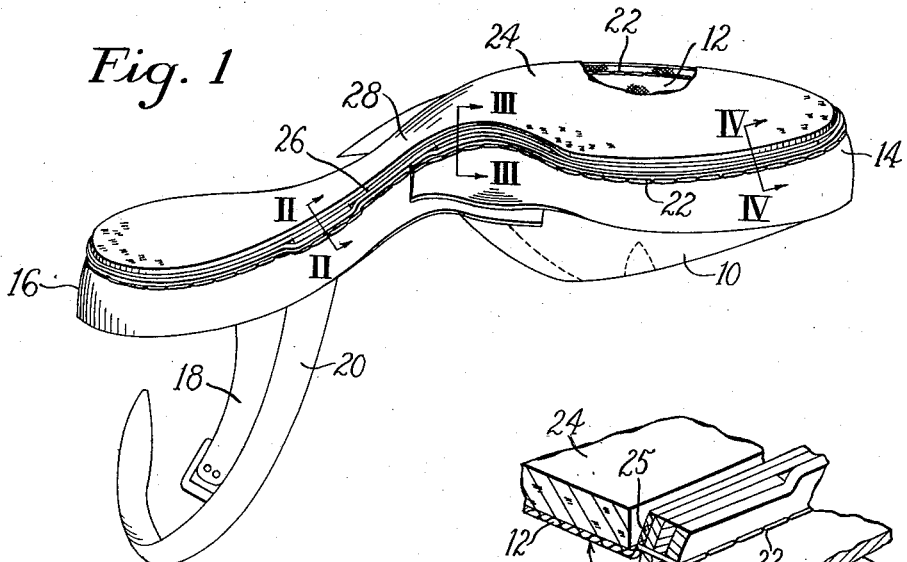
Fig. 1 is a perspective view partly broken away of a partially completed shoe, looking from one side and toward the bottom of the shoe.

Referring more particularly to the drawings, the shoe of Fig. 1 is illustrated in a condition just before a last is inserted, the parts of the shoe having been assembled by progressively stitching together superposed registering edges of a forepart upper 10, a sock lining 12, and a two-part wrapper strip 14—16. The complete upper of the shoe in this particular instance includes separate strap ends 18 and 20, spaced from the forepart upper, the upper being open along the shank portion of the shoe. The registering edges of the parts are attached together by a line of stitches 22.

Before insertion of the stitches 22 for attaching the shoe parts one surface of a platform sole 24 of slightly smaller dimensions than the sock lining is secured to the central area of the sock lining to stiffen it, leaving an excess or seam allowance 25 of a minimum possible width projecting beyond the platform sole a distance approximately equal to the thickness of the platform sole, providing unstiffened bare margins on the sock lining through which the stitches 22 pass. For locating the platform sole on the sock lining, apparatus may be employed similar to that disclosed in United States Patent No. 2,735,118, granted February 21, 1956, upon application of Fred T. MacKenzie, one of the present inventors.

Prior commercial practice has not found a method of making slip-lasted shoes acceptably, in which the parts are assembled by superposing their marginal portions with sections of their edges brought into register and stitching their margins after a platform sole is secured to the sock lining. Heretofore, the principal reason for rejecting such procedure is that the stiffening action of a platform sole on a sock lining has been too great a hindrance to convenient assembly with uniform configuration resulting in the shoe. Securing a platform sole to a sock lining necessarily stiffens it to such an extent that efforts to present the shoe parts to any prior commercially available sewing machine are defeated, prior machines acting during their operations to clamp the shoe parts into a flattened condition about the sewing point over such an area that, in order to stitch the parts successfully, one part is stretched and another contracted excessively, especially along shank portions of the seam which are curved with a relatively short radius.

Referring to Figs. 1 to 4, inclusive, it is evident that for a particular shoe a proper configuration along the edges as they are brought into register must follow a line, such as 26, while stitching the parts of the shoe together and the parts are caused to diverge from each other with the stitch line at the apex of a continually varying angle. The line 26 is curved in three dimensions, namely, lengthwise, crosswise and heightwise of the shoe. The proper edge line 26 is curved also through a relatively short radius along opposite sides of the shank, indicated at 28, of the shoe and it is while sewing this portion of the seam that the greatest difficulty is encountered, regardless of whether a platform is secured to the insole before or after assembly of the parts. The difficulty met in assembly varies directly with the necessity impressed by the nature of the sewing machine employed and by other factors tending to hold the edges of the shoe parts out of the proper configuration line 26.

In presenting the shoe parts to any prior sewing machine, especially along the shank 28 of the shoe, the margins being clamped into a flattened condition throughout extensive areas, reactional forces of considerable magnitude constantly tend to draw the edges out of registering relationship and out of conformity with the proper configuration line 26. If these forces are completely counteracted, certain parts of the shoe may be compressed along the line of stitching while bringing their margins into a flattened condition and other parts are elongated. Counteraction of these forces must be accomplished in advance of the stitching point and in so doing the compression and the elongation of the parts may be so great that they are pulled from the clamping devices in the machine, are ruptured or fail to return completely to their originally cut outlines after the seam is completed.

Securing a platform sole to the sock lining before stitching so reduces the flexibility of the sock lining and so stiffens it that there is no possibility of resisting the forces which tend to separate the registering edges when subjecting these edges to a clamping action acting to flatten them through any substantial area about the stitching point. It is for this reason that the machines disclosed in the Quinn patent applications, above referred to, were devised. These machines provide a clamping action of the parts operated upon through such short distances, less than ½" along their lengths and less than ¼" transversely of their lengths, that little or no force is needed to prevent a departure of their edges from registering relation within the proper outline and no danger of rupture or excessive distortion exists. Furthermore, the clamping and flattening action exerted by such machine on the margins of the parts operated upon is restricted to a small area of those portions only of the parts substantially on the line of stitches so that the clamping members in the machines act only on the excess width portions or seam allowances 25 of the sock linings, leaving the entire stiffened central area of the sock lining free of clamping action. The use of the Quinn machines, therefore, enables a platform sole to be secured to its central stiffened area while excess width on the sock lining which projects beyond the edge face of the platform sole is free to flex in any direction required by the assembling and stitching operation even along those portions of the platform sole outline having reverse bends.

Upon completing the assembly and insertion of the stitches 22 along the proper line in the shoe parts, it is desirable that they remain as free as possible from excessive concentrated strains, so that the operator who performs the method is permitted to sew the parts together without puckers in the upper. To prevent accumulation of excessive strains it is necessary for the parts, which are initially brought together along one portion of their edges while in flat condition, to be flexed during the stitching operation no more than is sufficient to bring other succeeding sections of their edges into register. With the use of prior machines and assembly procedures, in which the parts are stitched before the platform sole is secured to the sock lining, the sock lining is frequently flexed extensively throughout its entire area with extreme curvatures far exceeding those found in a completed shoe. Extreme curvatures are also imparted to the upper in a more or less equal degree with those imparted to the sock lining, one part taking up flexure transmitted to it through the completed stitches which attach the other parts.

When a bare unstiffened sock lining is employed its ability to flex and stretch enables the assembled parts to be conformed to a last 29 (Fig. 5) with the desired configuration, even though the sock lining is flexed during assembly more than is required by reason of the use of a sewing machine which clamps extensive areas along the edges of the parts. In attempts previously made to stitch the parts of a slip-lasted shoe including a sock lining prestiffened by the application of a platform sole, the added stiffness of the platform sole causes the sock lining to resist proper flexure to such an extent that the parts no longer can successfully be stitched with a commercially acceptable degree of uniformity on any machine prior to those of the Quinn invention, the edges of the sock lining and other parts tending to separate from proper register with each other and to become so distorted that they depart from the line 26 of proper configuration. This result is caused in part by the force of reaction on the sock lining tending to draw its margin laterally from clamped position in the machine or to force its margin into the machine until the sewing needle actually engages the platform sole, so as to infringe upon the central stiffened area of the sock lining.

Figure 7:
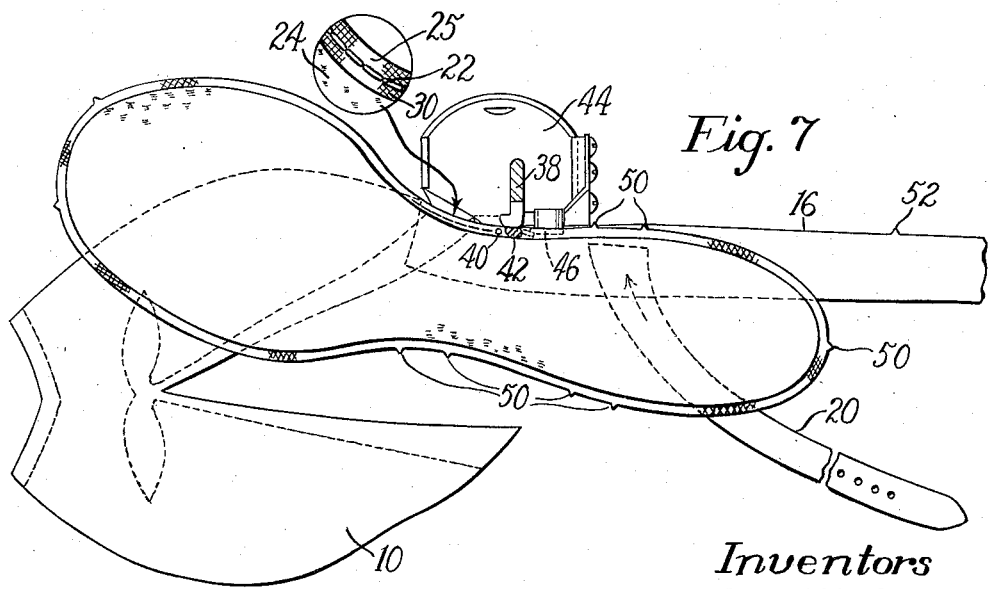
Fig. 7 is a plan view of the same machine with portions of the flat shoe parts shown in Fig. 6, a short section of the excess seam margin of the parts being shown on an enlarged scale.

According to the present invention, the parts of a slip-lasted shoe similar to that disclsed in the Chandler patents are assembled with a commercially acceptable degree of uniformity by progressively stitching the superposed margins of the upper on the unstiffened excess 25 of the sock lining along a line spaced by a band 30 (see Fig. 7) at a uniformly limited and fixed minimum distance from the edge face of the platform sole to provide smooth hinge action in the sock lining 22 where most of the flexing forces impressed on the sock lining are concentrated during assembly and stitching. The spacing of the line of stitching also is kept substantially less at all points than the thickness of the platform sole edge to prevent the seam from being drawn across the edge face of the platform sole when the wrapper strip is turned in completing the shoe. In this way a natural hinging action takes place about a corner of the platform sole and along the band 30 and the parts assume naturally diverging angles along the stitch line, varying from one part of the stitch line to another. The result is that a proper configuration of a shoe is obtained with convenient assembly procedures.

The feature which contributes most to the success of the present invention resides in successively clamping the otherwise unattached and superposed marginal portions of the sock lining and upper which project beyond the platform sole for a relatively short distance only about the point of stitching operations, while leaving the entire central stiffened area of the sock lining and other portions of the parts free of clamping action. Thus the hinge action of the narrow band 30 between the edge face of the platform sole and the stitches 22 is free to take up all of the flexure impressed upon the sock lining by the other parts and especially the central stiffened area of the sock lining receives less curvature than the other parts of the shoe.

As a result of experience obtained in the practice of the invention it has been found that a platform sole of one-half the thickness of that employed in the practice of the Chandler invention is advantageous. Thus, if a platform sole is selected having a reduced thickness equal to the projecting marginal excess 25 of the sock lining only, less stiffening action is provided than when a platform sole is employed having a thickness sufficient to accommodate the full width of an edge receiving rabbet together with its outer strip supporting shoulder. With a platform sole of reduced thickness, the guiding action of the sole edge face is still available and a second platform sole may be added after sewing to the first to provide a wrapper strip supporting shoulder if the style of shoe requires it.

Figure 3:
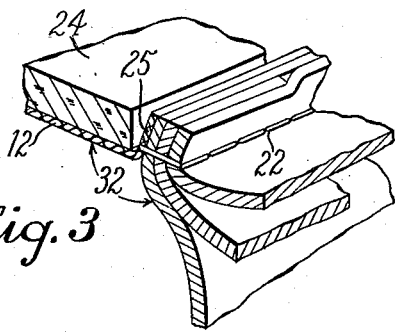
Fig. 3 is a similar view, as seen from the line III—III of Fig. 1.
Figure 2:
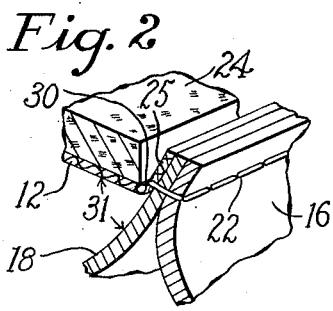
Fig. 2 is an angular sectional view on an enlarged scale, as seen from the line II—II in Fig. 1.
Figure 4:
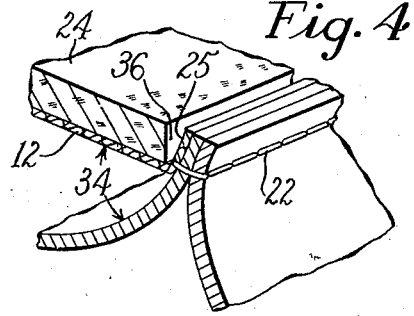
Fig. 4 is a similar view, as seen from the line IV—IV of Fig. 1.

Referring more particularly to Figs. 2, 3 and 4, it is readily apparent that the central area of the sock lining 12 is shown as having been stiffened by the platform sole 24 to an extent exceeding the stiffness of the upper 10 or that of the wrapper strip 16. The divergence of the upper 10 from the sock lining 12 varies from place to place, as indicated by the angles 31, 32 and 34, while the central stiffened area of the sock lining remains relatively flat and the flexure therein is concentrated along the line of the stitches within the narrow band of the sock lining between the stitches and the guiding edge face, indicated at 36, of the platform sole. Leaving the central area of the sock lining 12 and the other corresponding areas of the parts unrestrained from any clamping action facilitates in a particularly desirable fashion an assembly of the parts in a slip-lasted shoe. Increased facility of assembly is obtainable with the features of the present invention, whether a platform sole is secured to the sock lining before the stitching operation or whether other forms of stiffening are employed.

In the nature of a stitching operation the stitches necessarily are inserted progressively through the superposed marginal portions of the upper and sock lining. The assembling operation correspondingly is accomplished by continuously flexing the parts surrounding the stitching point in the machine employed and successively superposing and clamping marginal portions of the sock lining and upper which project beyond the platform sole or stiffened area in advance of the stitching point. Because the platform sole and the corresponding areas of the other parts are left unclamped, they are free to diverge from each other in accordance with the forces of reaction set up during the assembly operation. Also, because the clamping action is limited along the line of the stitches to a relatively short distance, application of excessive force is not required to flex the parts while bringing them into the configuration of a shoe.

Figure 6:
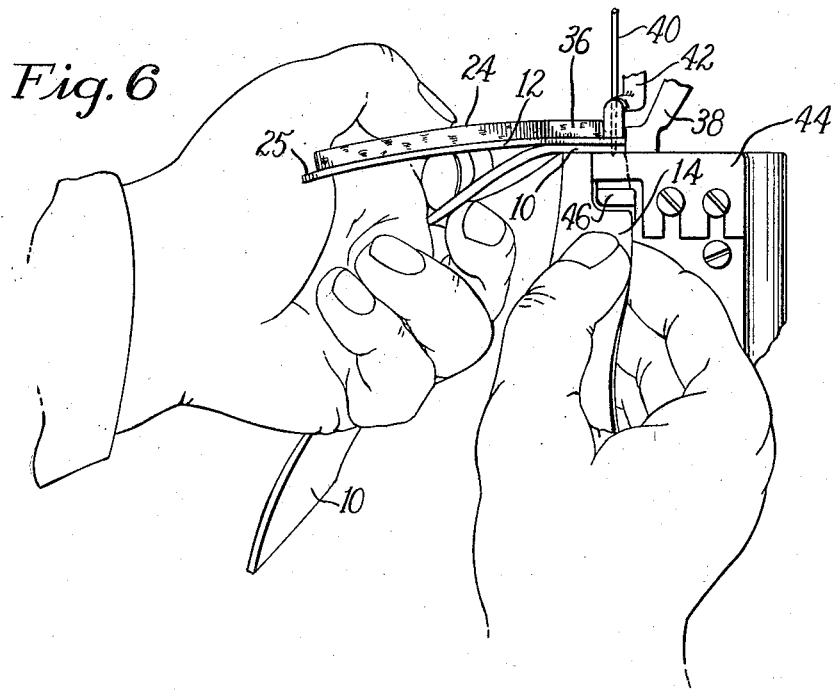
Fig. 6 is a view in front elevation of portions of a machine for assembling slip-lasted shoe parts in accordance with the present invention, illustrating the manner of initially presenting the parts to the machine.

The steps of assembling and stitching the parts of a slip-lasted shoe are more clearly illustrated in Figs. 6 to 12, inclusive, which show in Fig. 6 the preferred manner of superposing the margin of the upper 10 at one of its rearward ends on a stiffened sock lining presented in flat condition with sections of the edges of the parts in substantial register against an edge gage 38 in a sewing machine, corresponding to that disclosed in the Quinn applications. The sewing machine also is equipped with a straight eye-pointed needle 40, a presser foot 42, a work support post 44 and a wrapper strip guiding pilot 46. The use of the strip guiding pilot 46 simplifies assembling and stitching the parts of the slip-lasted shoe with a single seam only connecting the sock lining, upper and wrapper strip 14. The platform sole 24 not only stiffens the sock lining throughout its central area but provides the edge face 36, along which the stitches may be guided, if required, to insure the provision of the narrow hinge band 30 of adequate width along the sock lining edge beyond the platform sole. The edge face guiding action is particularly useful where the platform sole has not been secured accurately on the central area of the sock lining, providing a scant projecting margin thereof.

After the parts are presented, as illustrated in Fig. 6, to the machine and the wrapper strip 14 is projected through the wrapper strip pilot 46, if a wrapper strip is employed, a few stitches 22 (Fig. 7) are taken to form an initial fastening between the parts. During the initial fastening operation it is apparent that the preferred manner of presenting the parts, indicated in Fig. 6, is for the operator to grasp the combined sock lining and platform sole between the thumb and forefinger of his left hand and to hold the upper between the index finger and the second finger of that hand. The wrapper strip is passed through the pilot 46 to the stitching point by grasping it between the thumb and index finger of the right hand. The parts are all initially presented to the machine in flat superposed condition with sections along their edges opposite the stitching point as nearly as possible in register. Only a few initial stitches, however, may be inserted before the manner of presentation to the machine must be changed.

After the first initial stitches of a seam have been inserted the grasp of the upper 10 is released from the left hand and transferred to the right hand, the right hand also releasing the wrapper strip for automatic direction by the pilot 46. The reason for the change in presentation of the parts in this way is to control continuous flexure of the parts with the desired angular divergence in advance of the clamped portions as the stitching operation progresses. Flexure of the parts required to bring successive sections of their edges into register and to change the angle of divergence between the parts is essential to formation of the parts into proper shoe configuration. The change in presentation of the shoe parts is illustrated more specifically in comparison with Fig. 12, wherein it is apparent that grasps are obtained on the combined sock and platform sole between the thumb and fingers of the left hand and on the upper between the thumb and second finger of the right hand, together with a guiding action of the right index finger.

Figure 12:
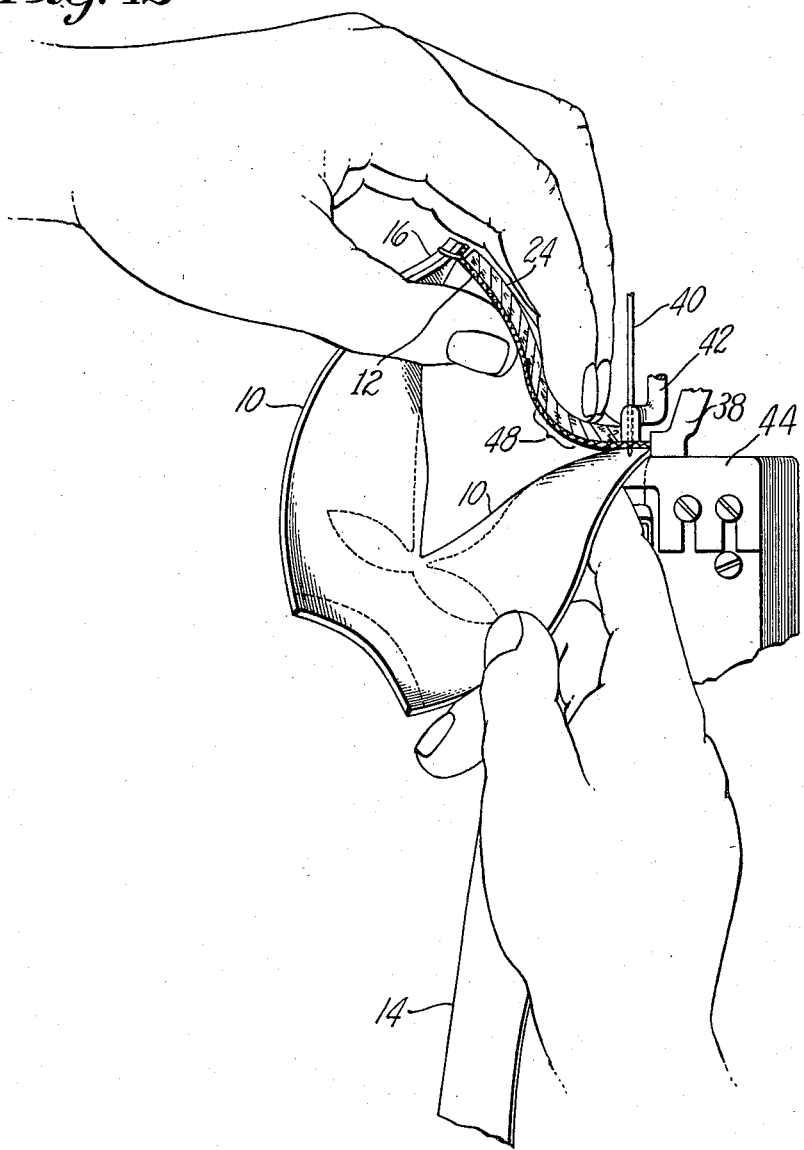
Fig. 12 is a perspective view, similar to Fig. 6 and partly in section of portions of the sewing machine and shoe parts in the positions shown in Fig. 8, illustrating the manner in which the forepart of the upper is guided through the machine during the operation of assembling the parts.

In order to present the platform stiffened sock lining 12 most effectively, a slight indentation 48 opposite the point of stitching operation is formed within the stiffened sock lining by a downward pressure of the left index and second fingers, so that the margins of the sock lining and platform sole may be bulged inwardly directly opposite the stitching point of the machine and so that the edge face 36 of the sock lining will engage most effectively the presser foot 42 and will also clear the needle 40. The grasp of the right thumb and second finger on the upper 10 is applied at some distance from the point of operation of the needle but full control of the positioning movements of the upper is obtained by inserting the right index finger beneath the edge of the wrapper strip with sufficient upward pressure to provide a frictional purchase on the strip without actually distorting or stretching it. This manner of presentation of the parts is particularly effectual while stitching the forepart 10 of the shoe upper. The positions of the operator's hands shown in Fig. 12 are found most desirable in controlling the movements of a combined sock lining and platform sole and an upper where the sole has been secured to the sock lining as a preliminary to the stitching operation.

The usual starting point in sitching a slip-lasted shoe is along the abruptly curving shank portions 28 of the parts. For the purpose of assisting the operator in locating the parts with respect to each other, their edges are provided with suitable index points 50. The index points are particularly useful when assembling and stitching a slip-lasted shoe with a multipart upper having an open shank. The index points 50 enable the toe part 14 of the wrapper strip and the upper to be initially stitched to the sock lining and the heel part 16 of the wrapper strip to be introduced into the stitching point in exactly the right relationship, so that the heel part 16 may be centered with an index point 50 at the heel end of the sock lining. For this purpose the heel part 16 is provided with an index point 52 (see Fig. 7) matching the heel point 50 on the sock lining.

As the assembling operation continues from the initially inserted stitches one edge section of the strap end 20 is interposed between the wrapper strip and sock lining in advance of the stitching point at a position indicated by the other index points 50 on the sock lining and the heel portion of the shoe is sewn completely, flexing the parts in the manner indicated as required. Before the heel portion of the shoe is completely sewn the edge section of the other strap end 18 is interposed between the wrapper strip and the sock lining at the corresponding index points 50 and the stitching operation is continued into the shank portion 28 of the shoe at the other side from which it was initially started. The positions of the parts when the opposite shank portion of the shoe is reached are shown in Fig. 8. When the proper index point on the sock lining is reached the edge section along the second opposite rearward end of the upper is interposed between the wrapper strip and sock lining and the shoe is completed by stitching entirely about the forepart and along the margins of the parts initially superposed to reinforce the stitches first inserted.

Just before the stitching reaches the opposite side of the shank from which the first stitches were inserted, the parts begin to assume the configuration of a shoe. The platform sole stiffened sock lining then begins to bend lengthwise about its shank portion 28 as the curvatures along the sock lining and upper require. Thus, the parts shown in Fig. 9 have already assumed the angle 31 and the parts at the stitching point, illustrated in Fig. 10, begin to approach the angle 32, shown in Fig. 3, except for the progressive indentation 48 of the platform sole and sock lining opposite the stitching point by the operator's left hand fingers. The relation of the upper and sock lining at the forepart of the shoe remaining still unsewn is illustrated in Fig. 11. After passing the stitching point the indentation 48 impressed on the platform sole and sock lining flattens out automatically to produce the required angular divergence without causing excessive distortion. As the assembly operation continues the shoe approaches the configuration illustrated in Fig. 1, the parts being strained only by a minimum essential flexure without being overly stressed to the point where excessive distortion takes place. The resulting shoe accordingly will fit snugly with the last 29 for which it is designed without any necessity for special treatment and the steps of completion may be carried out while the last is in place.

Figure 5:
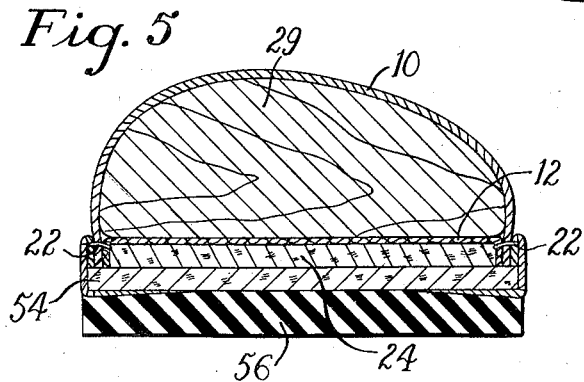
Fig. 5 is a sectional view of a completed shoe, the parts of which are assembled in accordance with the invention.

To complete the shoe of Fig. 1 in the manner indicated, in Fig. 5 a second platform sole 54 is applied to the tread surface of the first platform sole 24 and secured thereto by cement. The dimensions of the second platform sole 54 are somewhat greater than those of the first platform sole, so that when applied to the first sole the margins of the second sole project beyond the first sole by an amount equal to the combined thickness of the sock lining, upper and wrapper strip. The wrapper strip is then lasted over the edge faces of the second platform sole by turning it through an abrupt bend of 180°, at the same time a smooth bend is formed along the band 30 of the sock lining to cause it to fit a 90° corner of the platform sole 24. The wrapper strip is then carried inwardly beneath the tread surface of the second sole 54. In so doing the margins of the sock lining, upper and wrapper strip are bedded uniformly against the edge face of the first platform sole 24 and the turned over portions of the wrapper strip are supported on the shoulder formed by the edge face of the second sole 54. After securing the inwardly turned margin of the wrapper strip to the tread surface of the second sole 54 an outsole 56 is cemented to the second sole 54 and to the inturned margins of the wrapper strip.

While the present invention has been illustrated in the drawings as utilizing a platform sole to stiffen the central area of the sock lining before assembling and sewing the parts of a shoe, the invention contemplates stiffening the sock lining by other suitable means, such as the application of a coat of sizing or other hardenable plastic material or adhesive. The only precaution necessary to obtain the desired results is to apply the stiffened material to the sock lining within its central area only, terminating the application abruptly along an even line of definite demarcation at the proper distance from the edge of the sock lining. It is essential that the demarcation between the stiffened and unstiffened portions of the sock lining correspond to the outline upon which the shoe is to be based. In this way the flexure of the sock lining is confined to the narrow band 30 between the line of demarcation and the seam inserted, in the same manner as where a separate platform sole or its equivalent is employed.

The characteristics of the method of making a slip-lasted shoe, in accordance with the present invention, are capable of variation within the range of accepted equivalents. For instance, the use of a welt in place of a platform wrapper strip and the use of portions only of a platform sole in place of a complete platform sole in a shoe result in the benefits of the invention to the extent of use. Accordingly, in the claims herein, the terms "wrapper strip" and "platform sole" are intended to include their corresponding equivalents, such as, welts, heel pads, heel tucks and shank pieces when employed, as specified. In case of the platform sole equivalents, the principal requisite is that they be made thicker than the remaining portions of the sock linings but of smaller widthwise dimensions, and that they be secured to the central areas of the sock linings with the excess of width of each sock lining projecting beyond the edge face of the platform sole equivalent.

The nature and scope of the invention having been indicated and the essential procedures having been specifically described, what is claimed is:

1. That improvement in methods of making slip-lasted platform shoes, which consists in providing a flat shoe upper, a flat sock lining of relatively thin, flexible material and a flat platform sole thicker than the sock lining, all of the parts being cut with different outlines patterned from a shoe and the upper and the sock lining each having an outline matching that of the platform sole but with an excess width along the margin of the sock lining approximately equal to the thickness of the platform sole, securing one surface of the platform sole to the central area of the sock lining to stiffen said area with the excess width of the sock lining projecting beyond the edge face of the platform sole, superposing the margin of the upper on the flat sock lining with sections of their edges in substantial register, and progressively stitching the otherwise unattached superposed margins of the upper to the sock lining with the stitches outside the edge face of the platform sole to enable the sock lining to bend about the platform sole edge, which method includes the step of clamping only those successive portions of the superposed margins of the sock lining and upper projecting beyond the platform sole about the point of stitching operations while leaving the entire stiffened area of the sock lining unclamped, whereby to enable the operator to conform the upper to the platform sole outline, including portions of reverse bends and to permit the attachment of the upper with a seam without puckers.

2. That improvement in methods of making off the last, a platform shoe including a flat shoe upper, a flat sock lining of relatively thin, flexible material, a flat platform sole thicker than the sock lining, and a flat wrapper strip, all of the parts being cut with different outlines patterned from a shoe and the upper and sock lining each having an outline matching that of the platform sole but with an excess width along the sock lining approximately equal to the thickness of the platform sole, securing one surface of the platform sole to the central area of the sock lining to stiffen said area with the excess width of the sock lining projecting uniformly beyond the edge face of the platform sole, superposing the margins of the wrapper strip and upper on the flat sock lining with sections of their edges in substantial register, and progressively stitching the otherwise unattached superposed margins of the wrapper strip and upper to the sock lining along a line spaced at a uniform distance from the edge face of the platform sole and less than the thickness of the platform sole, which method includes successively clamping only those portions of the superposed margins of the wrapper strip, sock lining and upper which project beyond the platform sole about the point of stitching operations while leaving the entire stiffened area of the sock lining unclamped, whereby to enable the operator to conform the upper to the platform sole outline, including portions of reverse bends and to permit the attachment of the upper with a seam without puckers.

References Cited in the file of this patent

UNITED STATES PATENTS 2,546,152     Chandler _____ Mar. 27, 1951